(12) United States Patent
Yoshino (10) Patent No.: US 7,168,325 B2
(45) Date of Patent: Jan. 30, 2007

(54) GAS PRESSURE SENSOR

(75) Inventor: Kazuhiro Yoshino, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/075,663

(22) Filed: Mar. 10, 2005

(65) Prior Publication Data

US 2005/0199068 A1   Sep. 15, 2005

(30) Foreign Application Priority Data

Mar. 11, 2004   (JP) ............................. 2004-069026

(51) Int. Cl.
*G01L 9/16* (2006.01)
(52) U.S. Cl. ........................................ 73/754; 73/28.03
(58) Field of Classification Search .................. 73/754, 73/753, 756, 28.03
See application file for complete search history.

(56) References Cited

U.S. PATENT DOCUMENTS

| | | | |
|---|---|---|---|
| 5,386,730 A * | 2/1995 | Ikeda et al. | 73/706 |
| 6,050,146 A * | 4/2000 | Nakamura et al. | 73/725 |
| 6,601,453 B2 * | 8/2003 | Miyazaki et al. | 73/754 |

* cited by examiner

*Primary Examiner*—Edward Lefkowitz
*Assistant Examiner*—Andre Allen
(74) *Attorney, Agent, or Firm*—Posz Law Group, PLC (57) ABSTRACT

A gas pressure sensor 100 is disclosed as including a housing 10 to which a pressure is adapted to be introduced, a stem 20 communicating with the housing to admit the pressure thereto and having a diaphragm 22 deformable in response to the pressure, a sensor 24 associated with the diaphragm to produce an electric signal depending on a deformation of the diaphragm, and a substrate 30 that responds to the electric signal to generate an output signal that is outputted through a terminal 50. A chip capacitor 33 is connected between the terminal 50 and the substrate 30 and includes a first electrode 36, which admits a noise passing through the terminal 50 to be inputted to the substrate 30, and a second electrode 37 electrically connected to the housing 10, thereby enhancing improved resistance to noise.

10 Claims, 5 Drawing Sheets

TO SUBSTRATE CIRCUIT

GAS PRESSURE SENSOR

CROSS REFERENCE TO RELATED APPLICATIONS

This application is related to Japanese Patent Application No. 2004-69026 filed on Mar. 11, 2004, the content of which is hereby incorporated by reference.

BACKGROUND OF THE INVENTION

1. Field of the Invention

The present invention relates to gas pressure sensors and, more particularly, to a gas pressure sensor that has resistance to electromagnetic waves, applied from an external source, that is, a gas pressure sensor that is excellent in an electro magnetic compatibility (EMS: Electro Magnetic Compatibility).

2. Description of the Related Art

In the past, digital equipment has heretofore been widely used. With digital technology utilized in general, digital equipment creates electro magnetic waves, serving as interfering waves, in a wide frequency range, causing issues of various disturbances to other digital equipment.

In particular, digital equipment is adversely affected with the electro magnetic waves and radio waves released from other digital equipment to suffer defects such as degradation in function, erroneous operation and unintended halts. This is because the electro magnetic waves and radio waves, taken in digital equipment from external sources, make noise which results in failures in a circuit of digital equipment. With the occurrence of such issues, research and development work has been undertaken to provide digital equipment in practical use with improved resistance to noises so as to minimize adverse affects to be caused on digital equipment.

A gas pressure sensor, adapted for installation on a vehicle, serves as digital equipment that is susceptible to adverse affects caused by the electro magnetic waves. In particular, the electro magnetic waves, generated from an ECU mounted on the vehicle, transfer via wirings to which the gas pressure sensor is connected and are taken as noises in a circuit inside the gas pressure sensor, causing problems to occur in the gas pressure sensor.

In recent years, attempts have been made to devise a gas pressure sensor that improves resistance to noises resulting from electro magnetic waves, that is, a gas pressure sensor with improved noise resistance.

Figure 6:
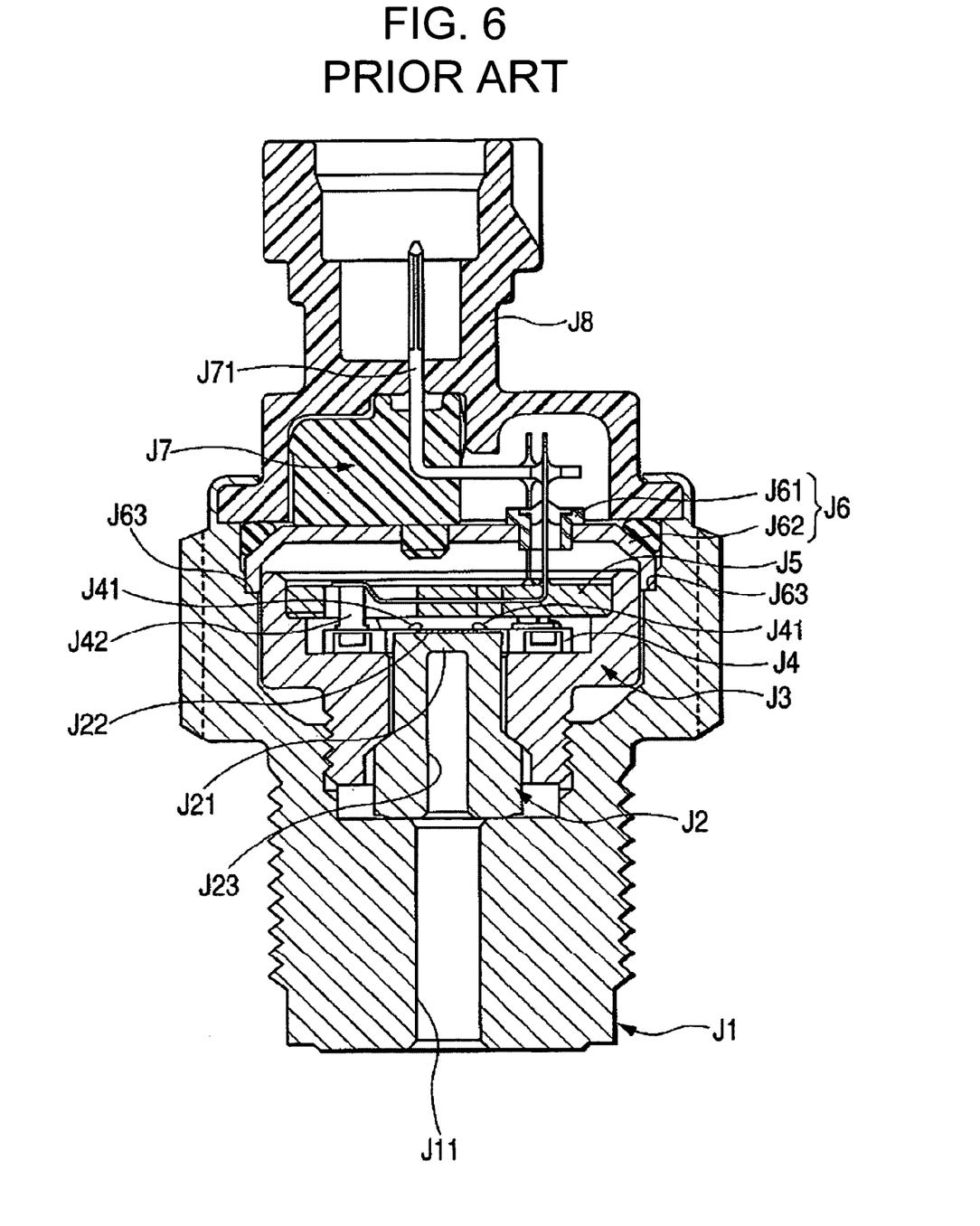
FIG. 6 is a schematic cross-sectional view of a gas pressure sensor of the related art.

FIG. 6 is a schematic cross-sectional view showing a gas pressure sensor of the related art. Hereinafter, a structure of the related art pressure sensor is described below with reference to FIG. 6.

The gas pressure sensor, shown in FIG. 6, is comprised of a housing J1, a stem J2, a threaded member J3, a substrate J4, a pin component J5, a feedthrough capacitor J6, a terminal component J7 and a connector J8.

Mounted inside the housing J1, which plays a role as a body earth, is the hollow stem J2 that includes a cylindrical hollow shaft whose one end is formed with a thin-walled diaphragm J21 serving as a closed portion and the other end formed with a channel. A sensor chip (sensor) J22 is fixedly secured to the diaphragm J21 of the stem J21, which is fixedly secured to the housing J1 by means of the threaded member J3 so as to allow the channel J23 of the stem J22 to communicate with a gas pressure passage (gas pressure passage) of the housing J1. This allows the other end of the stem J2 to be pressed against an opening peripheral edge of the gas pressure passage J11 to be kept in a sealing effect.

Placed on the threaded member J3 is the substrate J4 that is applied with a signal detected by the sensor chip J22 mounted on the diaphragm J21. The substrate J4 carries thereon an IC chip by which an output of the sensor chip J22 is amplified, an IC chip by which the output of the gas pressure sensor is regulated, a signal processing circuit, and an associated wiring pattern. The sensor chip J22 and the circuit on the substrate J4 are bonded to each other by wires J41.

Further, a pin J42 is fixedly secured to the substrate J4 by silver brazing to output the signal to the outside, and the pin J42 is joined to the pin component J5, mounted on the substrate J4, by laser welding. Disposed over the pin component J5 is a feedthrough capacitor J6 that is composed of a ceramic capacitor J61.

Furthermore, disposed over the feedthrough capacitor J6 is a terminal component J7 that includes terminals (for supplying electric power, grounding and outputting an output signal) J71, and the pin J42, mounted on the substrate J4, is electrically connected to the terminal through the pin component J5 and the feedthrough capacitor J6. A connector case J8 is tightly fitted to the housing J1 from an upper area of the terminal component J7 and caulked at an upper end of the housing J1 to be fixedly secured thereon, thereby forming the gas pressure sensor.

Among the components of the gas pressure sensor set forth above, the feedthrough capacitor J6 serves to minimize adverse affects caused by the electromagnetic waves applied to the gas pressure sensor from the external sources. The feedthrough capacitor J6 is comprised of a ceramic capacitor J61, which includes a ceramic layer sandwiched between metallic plates, and a metallic component J62 by which the ceramic capacitor J61 is fixedly secured. With the ceramic capacitor J61, one electrode is electrically connected to the respective terminal J71. The other electrode of the ceramic capacitor J61 is joined to a metallic plate component J62 whose distal end J63 is held in close contact with the housing J1 such that the ceramic capacitor J61 is grounded to the housing J1.

Such a gas pressure sensor with the structure set forth above is configured such that if the noises are inputted from the respective terminal J71, the noises are outputted via the housing J1 via the feedthrough capacitor J6. In such a way, the circuit of the substrate inside the gas pressure sensor is enabled to eliminate the adverse affects resulting the noises, thereby enhancing noise resistance in the gas pressure sensor. Accordingly, the gas pressure sensor is able to function without causing any trouble due to the noises inputted through the wirings to which the gas pressure sensor is connected.

However, in order to have noise resistance, a need arises for the gas pressure sensor of the above related art to be provided with the feedthrough capacitor J6. This results in increases in the number of component parts, which constitute the gas pressure sensor, and an assembling process increases in steps. Particularly, in order for the feedthrough capacitor J6 to be mounted, there is a need for the pin component J5 and the terminal component J7 to be additionally provided. The increase in the number of component parts of the gas pressure sensor leads to an increase in manufacturing costs of the gas pressure sensor.

A major reason why the gas pressure sensor includes a large number of component parts comes from the fact that the feedthrough capacitor J6 is provided in the gas pressure sensor. However, the feedthrough capacitor J6 serves to preclude the occurrence of defects in the gas pressure sensor due to the adverse affects resulting from the electromagnetic waves under circumstances where the gas pressure sensor is placed in a location susceptible to the electro magnetic waves from the external source. Thus, the feedthrough capacitor J6 is indispensable for the gas pressure sensor to be normally operative. Therefore, it is conceived that if the gas pressure sensor has no feedthrough capacitor J6, remarkable degradation occurs in noise resistance of the gas pressure sensor.

To address such an issue, an attempt may be conceivably made to replace the feedthrough capacitor, with a large size in structure, with a chip capacitor, with a smaller size in structure than the feedthrough capacitor, to allow the chip capacitor to be mounted on the substrate J4. With such an attempt, it is conceived that no need arises for using the pin component J5 and the terminal component J7, through which the terminal J71 and the circuit of the substrate J4 are electrically connected, and the gas pressure sensor is able to reduce the number of component parts, However, the chip capacitor takes the form of a structure composed of stacks of many ceramic and electrode layers and a probability occurs wherein a high frequency current is hard to flow due to the occurrence of hypothetical resistance components among the electrodes. That is, there is a probability for the chip capacitor to have a difficulty of obtaining a frequency characteristic equivalent to that of the feedthrough capacitor J6 through which a high frequency current is enabled to flow.

If the chip capacitor encounters the difficulty of obtaining the frequency characteristic equivalent to that of the feedthrough capacitor J6, then, the chip capacitor has a narrow frequency range for a signal to be able to pass through the chip capacitor. That is, for the frequency characteristic of the chip capacitor, it is conceived that if a noise, falling in a frequency outside the frequency range, is inputted to the gas pressure sensor, the noise is not inputted to the chip capacitor but is directly inputted to the circuit of the substrate J4, causing problems to occur in the circuit of the substrate J4.

Further, when using the chip capacitor, one electrode of the chip capacitor is electrically connected to the terminal J71 and internal circuit of the substrate J4 while the other electrode is electrically connected through the metallic plate component J62 to the housing J1 as described above. However, the noises, inputted from the terminal J71, flow into a branch point of the wiring between the circuit of the substrate J4 and the chip capacitor, and all of the noises inputted from the terminal J71 do not always flow into the chip capacitor. If the noises do not flow to the chip capacitor, the noises flow to the circuit of the substrate J4, causing problems to occur in the circuit of the substrate J4.

Therefore, even if the feedthrough capacitor J6 is replaced with the chip capacitor, there is a probability for the gas pressure sensor, employing the chip capacitor, to encounter a difficulty in obtaining noise resistance equivalent to that of the feedthrough capacitor J6 used in the related art.

SUMMARY OF THE INVENTION

The present invention has been completed with the above issues in mind and has an object to provide a gas pressure sensor that employs less number of component parts and enhances improved resistance to noises inputted to the gas pressure sensor for eliminating the noises.

To achieve the above object, one aspect of the present invention provides a gas pressure sensor comprising a housing having a gas pressure passage, and a hollow stem mounted in the housing in communication with the gas pressure passage and having a diaphragm operative to deform in response to a gas pressure passed through the gas pressure passage of the housing. A sensor is operative to output an electric signal as a function of deformation of the diaphragm, and a substrate has a circuit for generating an output signal in response to the electric signal delivered from the sensor and a chip capacitor having a first electrode to which noises are inputted and a second electrode from which the noises are outputted. A terminal is provided through which the output signal is delivered to an outside of the housing. The terminal and the circuit are electrically connected via the first electrode and the second electrode is electrically connected to the housing to allow the noises to be outputted to the housing.

With such a gas pressure sensor, since the chip capacitor with a small size is used, no need arises for employing a separate capacitor for eliminating noises inputted to the gas pressure sensor and the chip capacitor can be mounted on a wiring pattern of a substrate circuit. Accordingly, no need arises for providing a plurality of component parts by which the capacitor is mounted on the gas pressure sensor. In such a way, the number of component parts, by which the gas pressure sensor is structured, can be reduced. In addition, due to reduction in the number of component parts, assembling process of the gas pressure sensor can be decreased.

Further, the substrate is fixedly carried by the housing.

With such a structure, the substrate can be directly placed on the housing without intervening any additional support member, resulting in a simplified structure of the gas pressure sensor.

Further, the terminals and the substrate are not directly and electrically connected to each other but connected to each other through the first electrode of the chip capacitor, enabling the noises entering from the terminals to surely pass through the first electrode of the chip capacitor. This allows the noises to easily flow to the chip capacitor, making it easy for more noises to flow to the chip capacitor. This results in a capability of expanding the frequency range of the noises that can pass through the chip capacitor. Thus, the noises can be outputted to the housing through the second electrode, eliminating the noises from the gas pressure sensor. Therefore, the gas pressure sensor is able to have improved resistance to electro magnetic waves, that is, improved noise resistance.

According to a second aspect of the present invention, a wiring is placed on the substrate on a rear surface thereof and extends from the second electrode to electrically connect the second electrode to the housing.

With such a structure, the second electrode of the chip capacitor can be electrically connected to the housing. This enables the noises, inputted to the chip capacitor, to be outputted to the housing and an object to be measured, thereby enabling the elimination of the noises from the gas pressure sensor.

According to another aspect of the present invention, electrically conductive adhesive is coated on the wiring located on the rear surface of the substrate to allow the substrate to be adhered to the housing.

Thus, the presence of electrically conductive adhesive coated on the wiring on the rear surface of the substrate increases the contact surface area between the wiring and the housing. Therefore, it becomes possible to obtain the same effect as that in which the wiring is made thick to allow the current to easily flow.

According to another aspect of the present invention, the electrically conductive adhesive is coated on the rear surface of the substrate in a way to lap a circumferential periphery thereof.

Thus, the presence of the electrically conductive adhesive coated on the rear surface of the substrate in a way to lap the circumferential periphery thereof enables the wiring to have an increased contact surface area with the housing.

According to a further aspect of the present invention, the electrically conductive adhesive is coated on the rear surface of the substrate in a plurality of positions parallel to side faces of the substrate.

With such a structure, the electrically conductive adhesive can be coated on the rear surface of the substrate in the shortest time period, resulting in reduction in man-hours during fabrication of the gas pressure sensor.

According to a still further aspect of the present invention, the electrically conductive adhesive is coated on the rear surface of the substrate in multiple spots.

Such a structure enables the use of a jig to coat electrically conductive adhesive on the multiple spots so as to increase the contact surface area between the wiring and the housing, enabling reduction in man-hours during fabrication of the gas pressure sensor.

According to a still further aspect of the present invention, the chip capacitor includes a stack structure, composed of plate-like dielectric bodies and plate-like electrodes that are alternately stacked, which has both ends provided with the first and second electrodes, respectively.

Thus, the chip capacitor takes the form of a stack structure composed of a plurality of capacitors.

BRIEF DESCRIPTION OF THE DRAWINGS

For a better understanding of the present invention and to show how the same may be carried into effect, there will now be described by way of example only, specific embodiments according to the present invention with reference to the accompanying drawings, in which.

DETAILED DESCRIPTION OF THE PREFERRED EMBODIMENTS (First Embodiment)

Now, a gas pressure sensor of a first embodiment according to the present invention is described with reference to FIG. 1 to FIG. 5B. The gas pressure sensor of the presently filed embodiment is used under environments, such as engine rooms in vehicles, which are susceptible to electro magnetic waves.

Figure 1:
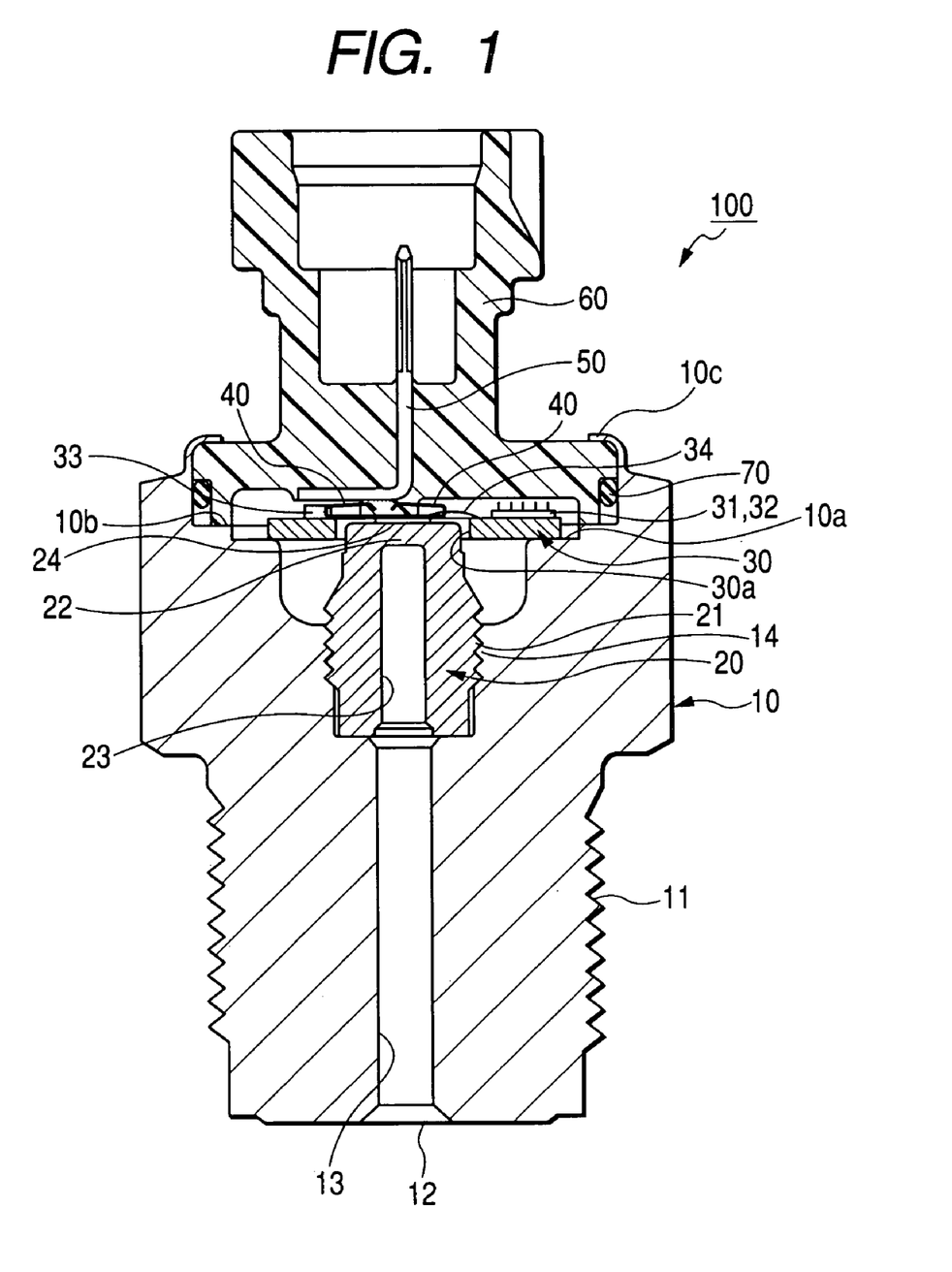
FIG. 1 is a schematic cross-sectional view of a gas pressure sensor of a first embodiment according to the present invention.

FIG. 1 is a schematic cross-sectional view of the gas pressure sensor 100 of the presently filed embodiment. As shown in FIG. 1, the gas pressure sensor 100 is comprised of a housing 10, a stem 20, a substrate 30, spring terminals 40, terminals 50 and a connector case 60.

The housing 10 takes the form of a hollow case, made of metal, which is formed by cutting or cold forging and has one end whose outer periphery is formed with a threaded portion 11 to allow the housing 10 to be coupled to an object to be measured (hereinafter referred to as a measuring object). The one end of the housing 10 is formed with an opening 12 from which a gas pressure passage 13 extends through the housing 10 toward the stem 20 to play a role as a pressure guide channel to admit a pressure to be measured.

The stem 20 includes a metallic member formed in a hollow cylindrical shape and has an outer periphery formed with a male threaded portion 21 that is screwed into a female threaded portion 14 formed in the housing 10 in concentric relation with the gas pressure passage 13 to be tightly fitted inside the housing 10. The stem 20 has one end, formed with a thin-walled diaphragm 22 that is deformable due to pressure introduced to the housing 20, and the other end formed with a passage 23 leading to the diaphragm 22.

With such a structure, the passage 23 is brought into communication with the gas pressure passage 13 of the housing 20 to allow pressure applied to the measuring object to be transferred to the diaphragm 22 via the gas pressure passage 13.

Further, fixedly secured onto the diaphragm 22 of the stem 20 is a sensor chip 24, made of amorphous Si (silicon). The sensor chip 24 includes an integrated circuit and serves as a sensor (strain gauge) that is operative to output an electric signal as a function of deformation of the diaphragm 22.

More particularly, as the diaphragm 22 deforms due to a gas pressure introduced to the inside of the stem 20, the strain gauge, located on the diaphragm 22, is caused to deform. When this takes place, the presence of deformation in the strain gauge results in reduction in a cross-sectional surface area of an element forming the strain gauge, causing variation in a resistance value of the strain gauge. As a consequence, detecting variation in the resistance value of the strain gauge enables the detection of stress applied to the strain gauge, that is, the pressure introduced to the inside of the stem 20. Thus, the diaphragm 22 and the sensor chip 24 have influences on a fundamental performance of the gas pressure sensor 100.

The substrate 30 has a function to convert an input signal, delivered from the sensor chip 24, to an output signal to be outputted to an external circuit. In particular, the substrate 30 is comprised of an IC chip 31 that amplifies the input signal delivered from the sensor chip 24, an IC chip 32 by which the signal to be outputted from the gas pressure sensor 100 is adjusted in a specification range specified for the gas pressure sensor, a chip capacitor 33 by which noises, inputted to the gas pressure sensor 100, are minimized, and a circuit, by which signals are processed, and a wiring pattern. The sensor chip 24 and the substrate 30 are electrically connected to each other through a wiring 34 welded by wire bonding to allow the input signal from the sensor chip 34 to be inputted to the circuit and the IC chips 31, 32 placed on the substrate 30. The substrate 30 is placed on a shoulder 10a, formed inside the housing 10 on a plane perpendicular to an axis of the housing 10 in an area near the one end of the stem 20, and is fixedly secured to the shoulder 10a by electrically conductive adhesive such as silver paste.

Also, in order to input the input signal from the sensor chip 24 to the substrate 30 through the wiring 34, the substrate 30 is formed with an aperture 30a to accommodate therein the diaphragm 22 of the stem 20 such that a surface of the sensor chip 24 on the diaphragm 22 is aligned with a front surface of the substrate 30 on a substantially same plane.

The spring terminals 40 electrically connect the circuit inside the substrate 30 and the terminals 50 and each spring terminal 40 is formed of a single sheet of metal plate whose both ends are folded into spring shapes. Also, each spring terminal 40 is formed of phosphor bronze and is directly bonded to the substrate 30 by electrically conductive adhesive at a position where an electrode is located, A spring portion of each spring terminal 40 is held in abutting contact with the associated terminal 50, making it possible to provide electrical connection between the circuit of the substrate 30 and the associated terminal 50.

Further, the gas pressure sensor 100 of the presently filed embodiment includes three terminals 50, as described below, and three spring terminals 40 that are placed on the substrate 30. Thus, the spring terminals 40 are electrically connected to the terminals 50, respectively.

Each terminal 50 is formed of an L-shaped bar-like member and incorporated in the connector case 60. Further, each terminal 50 has a lower end, formed in a flat shape, to which the spring portion of each spring terminal 40 is held in abutting contact. With the presently filed embodiment, the three terminals 50, for supplying electric power to the gas pressure sensor 100 for operation thereof, grounding and outputting signals, are located in the connector case 60. The terminals 50 include distal end portions that are connected to an external connector (not shown) whose wiring members are electrically connected to a control circuit such as an ECU of an automobile.

The connector case 60 plays a role as a connector through which an output signal, indicative of a pressure detected by the gas pressure sensor 100, is outputted to the external circuitry and is made of plastic resin. The connector case 60 is tightly fitted to the other end of the housing 10 via a sealing member 70, such as an O-ring, such that a lower end of the connector case 60 rests on a shoulder 10b, adjacent to the shoulder 10a, of the housing 10 upon which the other end of the housing 10 is caulked at one end 10c to press and hold the connector case 60 in a fixed position, This allows the connector case 60 to be unitarily coupled with the housing 10 to form a package by which the sensor chip 24, the substrate 30 and associated electrical connecting portions are protected from humidity and external mechanical forces.

With the gas pressure sensor 100 with such a structure set forth above, the diaphragm 22 strains upon receipt of a pressure introduced through the gas pressure passage 13 to cause the sensor chip 24 to produce an electric signal indicative of a resistance value depending on the resulting strain. The electric signal is then converted in the circuit of the substrate 30 to an output signal, which in turn is outputted from the circuit of the substrate 30 to the terminals 50 through the respective spring terminals 40 for detection of the pressure.

Figure 2A:
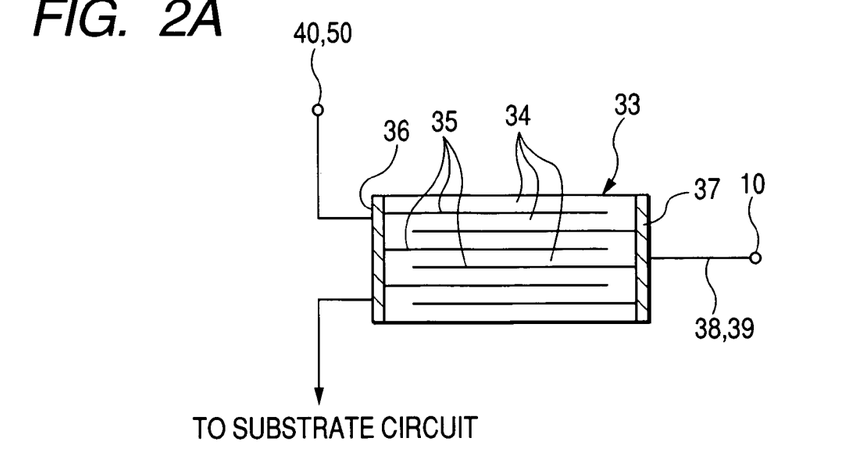
FIG. 2A is a schematic view of a chip capacitor used in the gas pressure sensor shown in FIG. 1.
Figure 2B:
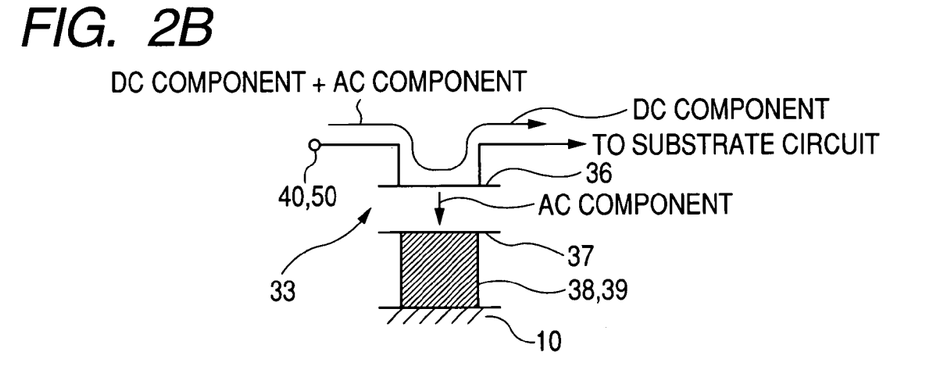
FIG. 2B is an equivalent circuit view corresponding to the chip capacitor shown in FIG. 2A.

Now, a detailed description is made of the chip capacitor 33 previously described above. FIG. 2A is a schematic view for illustrating the chip capacitor 33, and FIG. 2B is an equivalent circuit corresponding to the chip capacitor 33 shown in FIG. 2A.

As shown in FIG. 2A, the chip capacitor 33 takes the form of a stacked structure composed of a plurality of plate-like ceramics 34, each of which is made of dielectric material, and a plurality of plate-like electrodes 35 that are alternately overlapped each other. In addition, the chip capacitor 33 has a structure wherein a cuboidal body, formed of the plate-like ceramics 34 and the plate-like electrodes that are alternately stacked, has distal ends that are sandwiched between first and second electrodes 36, 37. The chip capacitor 33, with a size in the order of approximately 2 mm, is mounted on a wiring pattern of the substrate 30 and electrically connected to the spring terminals 40 and the circuit of the substrate 30.

More particularly, electrically connected to the plurality of terminals 50 are the respective spring terminals 40 to which the first electrodes 36 of the chip capacitors 33 are connected, respectively. Also, the first electrodes 36 of the chip capacitors 33 are electrically connected to the circuit of the substrate 30. As shown in FIG. 2B, although the spring terminal 40 and the circuit of the substrate 30 are electrically connected to each other, the spring terminal 40 and the circuit of the substrate 30 are not directly and electrically connected to each other but electrically connected via the first electrode 36 of the chip capacitor 33. That is, the first electrode 36 plays a role of a portion of a wiring through which the spring terminal 40 and the circuit of the substrate 30 are electrically connected.

In the meanwhile, the second electrode 37 of the chip capacitor 33 is electrically connected to the housing 10. In particular, the substrate 30 is formed with a through-hole 30b (see FIG. 3), extending from a front surface of the substrate 30 to a rear surface thereof, into which one end of a wiring 38 is inserted to extend to a rear surface of the substrate 30 in is a manner as will be described below. The second electrode 37 of the chip capacitor 33, mounted on the substrate 30, is connected to the wiring 38, a major portion of which is located along an outer circumferential periphery of the substrate 30 at the rear surface thereof.

Figure 3:
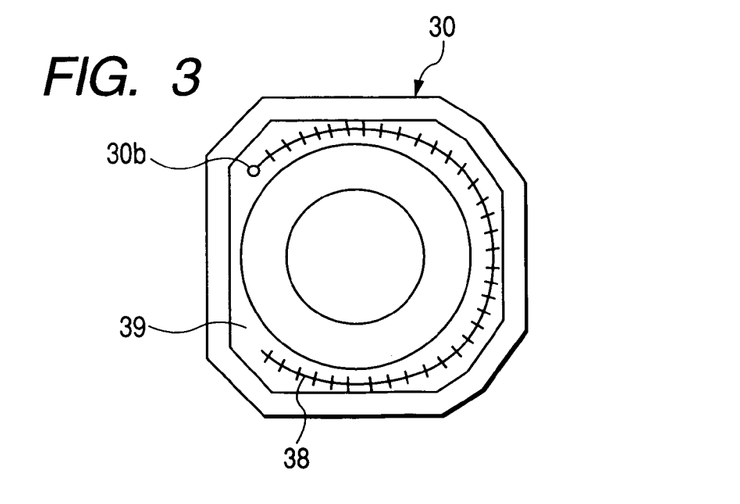
FIG. 3 is a schematic view of a rear surface of a substrate forming part of the gas pressure sensor shown in FIG. 1.

FIG. 3 is a schematic view of the rear surface of the substrate 30 of the gas pressure sensor 100. As shown in FIG. 3, with the presently filed embodiment, the wiring 38 is located along the outer circumferential periphery of the substrate 30 on the rear surface thereof, and electrically conductive adhesive 39 is coated on the outer circumferential periphery of the substrate at the rear surface thereof so as to lap the outer circumferential periphery of the substrate 30 to cover the wiring 38. Subsequently, the substrate 30, on which electrically conductive adhesive 39 has been coated, is placed on the shoulder 10a of the housing 10, providing electrical connection between the second electrode 37 of the chip capacitor 33 and the housing 10.

Thus, extending the wiring 38 along the outer circumferential periphery of the substrate 30 at the rear side thereof and increasing a contact surface area of the wiring 38 with respect to the housing 10 provides the same effect as that in which the wiring 38, connected from the second electrode 37 to the housing 10, is made thick. That is, the wiring 38 has a widened path through which a current flows. This allows the current to easily flow into the chip capacitor 33, that is, noise to flow easily into the housing 10.

Next, description is of made of the noises flowing through the chip capacitor 33. First, electrical exchange occurs in the form of direct current components (DC components), forming a signal, between the gas pressure sensor 100 and external equipment (such as an ECU). Under such a condition, if the wiring member connected between the gas pressure sensor 100 and the external equipment, are subjected to adverse affects resulting from electromagnetic noises, the presence of the electromagnetic noises causes alternating current components (AC components), which form noises, to occur in the wiring member. Then, as shown in FIG. 2B, a DC component and an AC component, are inputted from the terminal 50 and the spring terminal 40 of the gas pressure sensor 100 to the chip capacitor 33. Also, it is probable for only the AC component to be inputted to the chip capacitor 33.

In such a way, the AC component, taken into the gas pressure sensor 100, is inputted to the first electrode 36 of the chip capacitor 33. When this takes place, of the signals inputted to the first electrode 36, that is, of the DC component and the AC component, only the AC component, forming alternating current component, flows from the first electrode 36 to the second electrode 37. In other words, since the chip capacitor 33 causes no DC component to flow, only the DC component is inputted to the circuit of the substrate 30.

Further, the AC component, flowing into the second electrode 37, flows through the wiring 38 and the electrically conductive adhesive 39 to the housing 10 from which the AC component is outputted to the measuring object. Thus, the AC component, which includes the noises taken into the gas pressure sensor 100, is removed from the gas pressure sensor 100.

With the presently filed embodiment, a circuit design is made such that the noises inputted to the gas pressure sensor 100 are surely inputted to the first electrode 36 of the chip capacitor 33. Also, the electrical connection is established between the second electrode 37 of the chip capacitor 33 and the housing 10 through a combination between the wiring 38 and electrically conductive adhesive coated thereof to provide an increased cross sectional area through which the current flows, causing the noises, inputted to the chip capacitor 33, to easily flow into the housing 10. The presence of such a circuit design and wiring pattern enables the current to reliably flow through the chip capacitor 33, that is, the first electrode 36 of the chip capacitor 33, thereby increasing the rate of current to be inputted to the chip capacitor 33. This increases a frequency range available for the current to flow to the chip capacitor 33.

The increase in the frequency range of the current flowing into the chip capacitor 33 is reflected by an increase in the noise resistance of the gas pressure sensor 100 for the noises involving various frequency components inputted to the gas pressure sensor 100. With the presently filed embodiment, the frequency range of the chip capacitor 33 falls in a value in the order of 1 MHz to 1 GHz, thereby enabling the noises inputted to the gas pressure sensor 100 to be dramatically eliminated. Thus, even in the structure wherein the chip capacitor 33 is used in the gas pressure sensor 100, contriving a circuit design and wiring pattern, on which the chip capacitor 33 is mounted, enables the chip capacitor 33 to have a frequency characteristic equivalent to that of the related art pressure sensor, enhancing improved noise resistance.

In actual practice, the related art pressure sensors and the gas pressure sensors of the presently filed embodiment are applied with noises to study noise resistances for comparison. More particularly, a given voltage (, for instance, at 5V) is applied to the various pressure sensors to be rendered operative and are applied with a field signal, forming a noise, as an input signal. Then, a frequency of the input signal to be applied to the various pressure sensors are varied and the resultant output signals of the various pressure sensors are detected to study a difference (the amount of fluctuation) between the applied voltage and the output voltage.

Thus, by studying the output voltages resulting when the input signals (that is, the noise) are applied to the gas pressure sensors, it is possible to conduct a search as to whether the input noises are outputted via the circuits of the various sensors to an external circuit. That is, the presence of a decrease in the difference between the applied voltage and the output voltage is meant that the noises applied to the gas pressure sensor are minimized. On the contrary, the presence of an increase in the difference between the applied voltage and the output voltage is meant that the noises are not minimized in the gas pressure sensor and outputted together with the output voltage to the external circuit via the circuit of the substrate.

Figure 4A:
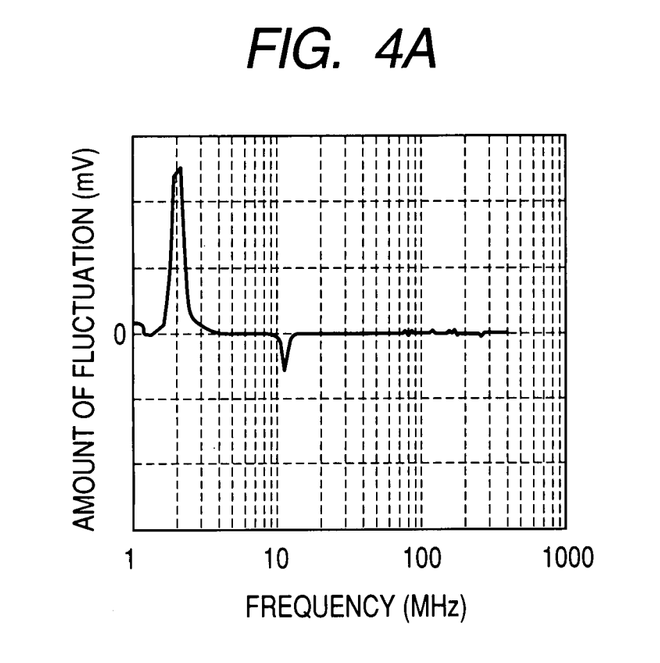
FIG. 4A shows the amount of fluctuation of a noise achieved by a gas pressure sensor of the related art in terms of a frequency (MHz)
Figure 4B:
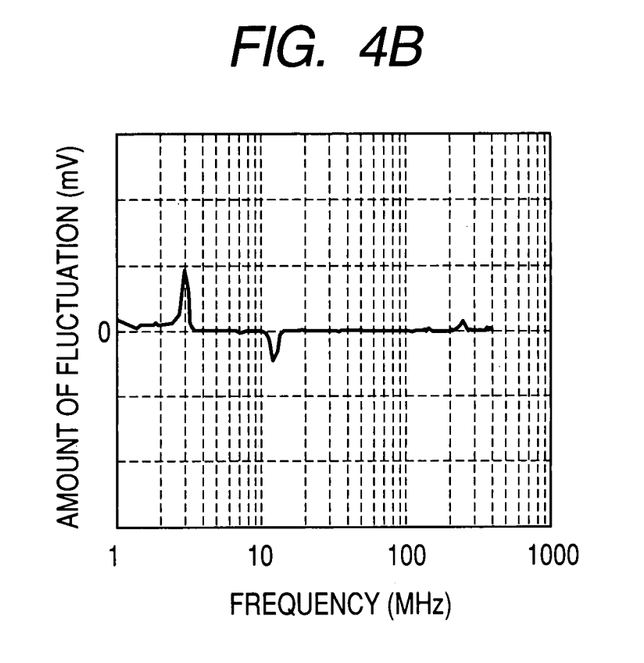
FIG. 4B shows the amount of fluctuation of a noise achieved by the gas pressure sensor of the presently filed embodiment in terms of the frequency (MHz)

FIGS. 4A and 4B are views showing graphs each of which is plotted with the amount of fluctuation (mV) in an output voltage in terms of a frequency (MHz) at which an input signal is inputted to each pressure sensor. FIG. 4A shows the graph resulting from the related art pressure sensor, and FIG. 4B shows the graph showing the amount of fluctuation in the output voltage of the gas pressure sensor 100 of the presently filed embodiment.

It will be appreciated that a peak of the amount of fluctuation in the output voltage at a frequency range in the order of 1 to 4 MHz, shown in FIG. 4B, is less than a peak of the amount of fluctuation in the output voltage, which belongs to the same frequency range, shown in FIG. 4A. This is due to the fact that the gas pressure sensor 100 of the presently filed embodiment is effective to output more noises to the housing 10 than those transmitted to the housing in the related art pressure sensor. Thus, the gas pressure sensor of the presently filed embodiment has more improved resistance to noise than that of the related art pressure sensor. Also, it will be appreciated that the peak of the amount of fluctuation at the frequency range in the vicinity of 1 to 4 MHz, shown in FIG. 4B, is less than the peak of the amount of fluctuation in the same frequency range shown in FIG. 4A.

Further, a plurality of peaks in the output voltage, appearing in a vicinity of a frequency at 100 MHz shown in FIG. 4B, are signal noises. Thus, it can be said that these peaks in the output voltage, detected by the gas pressure sensor, is in the order of mV and form the peaks derived from the sensor. Upon consideration of such results, by contriving the wiring pattern (see FIGS. 2A and 2B) of the chip capacitor 33 in the substrate 30, the gas pressure sensor 100 of the presently filed embodiment is enabled to have improved resistance to high frequency noises at a frequency higher than 100 MHz.

From such results, it can also be said that the gas pressure sensor of the presently filed embodiment has the same or more resistance to noise than that of the related art pressure sensor, Thus, even with the gas pressure sensor 100 to which the chip capacitor 33 is applied, the gas pressure sensor 100 is able to have improved resistance to noise.

With the presently filed embodiment, the use of the chip capacitor 33 with a small size in structure provides no need for separate additional component parts for the chip capacitor, enabling the chip capacitor 33 to be mounted on the wiring pattern of the circuit of the substrate 30. As a consequence, there is no need for the separate additional component parts, as required in the related art pressure sensor, to be mounted in the housing for placing the capacitor therein. In such a way, it becomes possible to reduce the number of component parts forming the gas pressure sensor 100. In addition, the reduction in the number of component parts results in reduction in an assembling process for the gas pressure sensor 100.

Further, the use of the first electrode 36 of the chip capacitor 33 as a portion of the wiring enables signals, inputted from the terminals 50 and the spring terminals 40, that is, AC components forming noises, to surely pass through the first electrode 36 of the chip capacitor 33. This enables the AC components to be surely inputted to the chip capacitor 33 for making it easy for the AC components to flow to the housing 10. This results in an increase in a frequency range for the noises to flow to the chip capacitor. Accordingly, the gas pressure sensor 100 is able to have improved resistance to electromagnetic waves, that, improved resistance to noises.

Furthermore, the second electrode 37 of the chip capacitor 33 is electrically connected to the housing 10 to be grounded. This enables the noises, inputted to the gas pressure sensor 100 via the chip capacitor 33, to be transferred to the housing 10. Accordingly, the noises, inputted to the gas pressure sensor 100, to be outputted to the outside of the gas pressure sensor 100, eliminating the noises from the gas pressure sensor 100.

In such a way, with the gas pressure sensor 100 of the presently filed embodiment, when electrically connecting the second electrode 37 of the chip capacitor 33 and the housing 10 to each other, the wiring 38 is so placed as to extend from the second electrode 37 to the rear surface of the substrate 30 and covered with electrically conductive adhesive 39. This the wiring 38, through which a current flows, to have an increased current flow path, making it easy for the noises to transfer from the second electrode 37 to the housing 10.

The above-described electrically conductive adhesive 39 is coated on the outer circumferential periphery of the substrate 30 at the rear side thereof in a way to lap the outer circumferential periphery of the substrate 30. With such a layout, the contact surface area between electrically conductive adhesive 39 and the housing 10 can be increased, enabling the second electrode 37 of the chip capacitor 33 and the housing 10 to be electrically connected in the same way as that in which both components are connected through a thickened wiring. This enables the noises to easily transfer from the chip capacitor 33 to the housing 10. Accordingly, it becomes possible to enhance the frequency range for the current to flow into the chip capacitor 33, thereby enabling the gas pressure sensor 100 to enhance the noise resistance.

(Other Embodiment)

Although the first embodiment discussed above has been related to a structure wherein electrically conductive adhesive 39, to be coated on the rear surface of the substrate 30, is coated on the outer circumferential periphery of the substrate 30 so as to lap the same, such a structure is merely disclosed as an exemplary case. But, the coating pattern for electrically conductive adhesive 39 may be implemented in various other ways. Other examples of the coating pattern for electrically conductive adhesive 39 are described below with reference to FIGS. 5A and 5B.

Figure 5A:
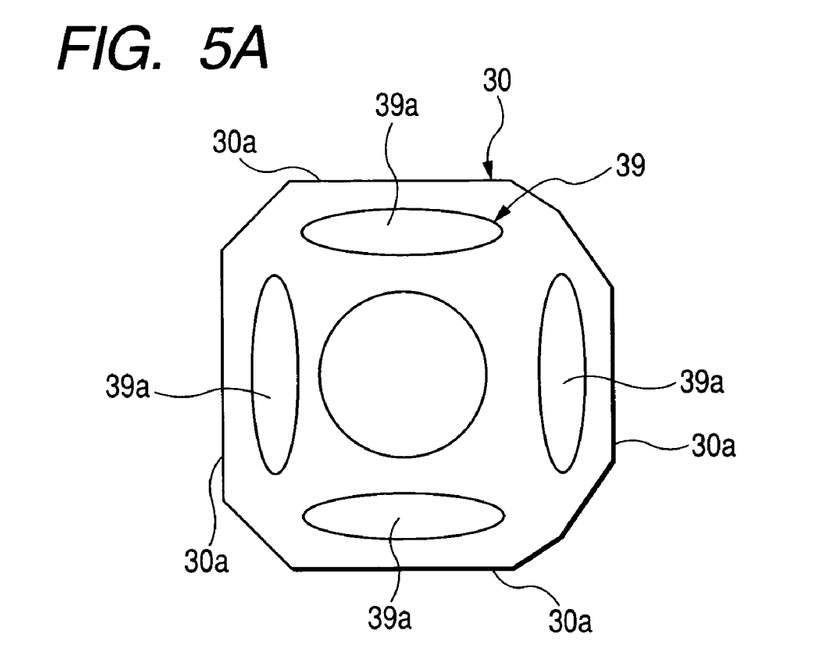
FIG. 5A is a schematic plan view illustrating one exemplary coating pattern for electrically conductive adhesive to be coated on the rear surface of the substrate.

FIG. 5A is a view showing one exemplary structure wherein electrically conductive adhesive 39 is coated on the rear surface of the substrate 30 in four areas 39a in parallel to side faces of the substrate 30. In such a way, electrically conductive adhesive 39 may be coated on the rear surface of the substrate 30 in four positions 39a parallel to chamfered portions 30a of the substrate 30 in an overlapped relationship with the wiring (not shown).

Figure 5B:
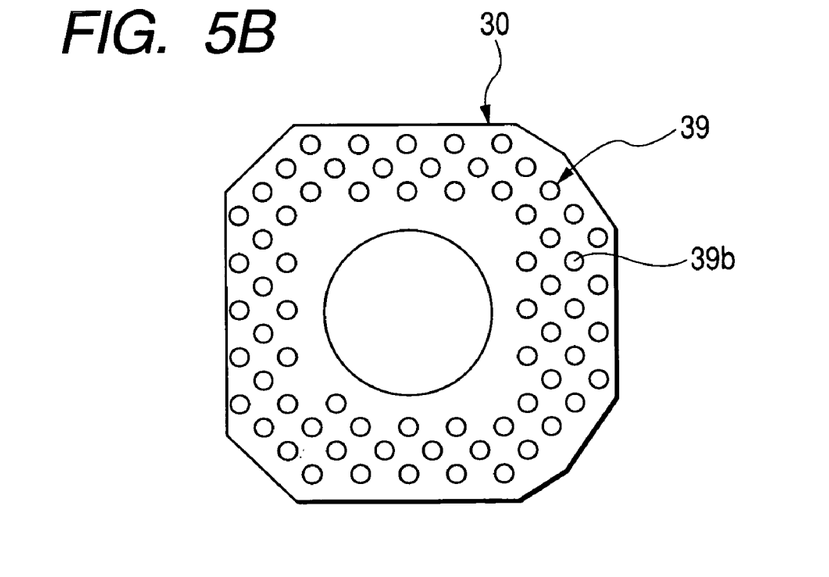
FIG. 5B is a schematic plan view illustrating another exemplary coating pattern for electrically conductive adhesive to be coated on the rear surface of the substrate.

FIG. 5B is a view showing the other exemplary structure wherein electrically conductive adhesive 39 is coated on the rear surface of the substrate 30 in multiple spots 39b. In such a way, electrically conductive adhesive 39 may be coated on the rear surface of the substrate 30 in the multiple spots 39b in contact with the wiring 37 in a partially overlapped relationship with the wiring (not shown).

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof, For instance, although the first embodiment has been described above with reference to an exemplary application where the chip capacitor 33 is of the stack type, the present invention is not limited to such an application. That is, the capacitor may be sufficed to have a structure that includes two electrodes like the first and second electrodes 36, 37 of the chip capacitor 33 of the first embodiment.

What is claimed is:

1. A gas pressure sensor comprising:
   a housing having a gas pressure passage;
   a hollow stem mounted in the housing in communication with the gas pressure passage and having a diaphragm operative to deform in response to a gas pressure passed through the gas pressure passage of the housing;
   a sensor operative to output an electric signal as a function of deformation of the diaphragm;
   a substrate having a circuit for generating an output signal in response to the electric signal delivered from the sensor;
   a terminal through which the output signal is delivered to an outside of the housing; and
   a chip capacitor mounted on the substrate, the chip capacitor having a first electrode and a second electrode to absorb noise appearing in the output signal,
   the first electrode having an input portion to which the terminal is connected and an output portion to which the substrate is connected.

2. The gas pressure sensor according to claim 1, wherein the substrate is fixedly carried by the housing.

3. The gas pressure sensor according to claim 1, further comprising:
   a wiring placed on the substrate on a rear surface thereof and extending from the second electrode to electrically connect the second electrode to the housing.

4. The gas pressure sensor according to claim 3, wherein an electrically conductive adhesive is coated on the wiring located on the rear surface of the substrate to allow the substrate to be adhered to the housing.

5. The gas pressure sensor according to claim 3, wherein the electrically conductive adhesive is coated on the rear surface of the substrate in a way to lap a circumferential periphery thereof.

6. The gas pressure sensor according to claim 3, wherein the electrically conductive adhesive is coated on the rear surface of the substrate in a plurality of positions parallel to side faces of the substrate.

7. The gas pressure sensor according to claim 3, wherein the electrically conductive adhesive is coated on the rear surface of the substrate in multiple spots.

8. The gas pressure sensor according to claim 3, wherein the chip capacitor includes a stack structure, composed of plate-like dielectric bodies and plate-like electrodes that are alternately stacked, which has both ends provided with the first and second electrodes, respectively.

9. A gas pressure sensor comprising:
a housing having a gas pressure passage;
a hollow stem mounted in the housing in communication with the gas pressure passage and having a diaphragm operative to deform in response to a gas pressure passed through the gas pressure passage of the housing;
a sensor operative to output an electric signal as a function of deformation of the diaphragm;
a substrate having a circuit for generating an output signal in response to the electric signal delivered from the sensor;
a connector case having one end facing one end of the housing and fixedly connected thereto so as to allow the substrate to be mounted on the housing, the connector case carrying therein a terminal having one end exposed to an area near the substrate and the other end exposed to an outside of the connector case; and
a chip capacitor mounted on the substrate for absorbing noises appearing in the output signal and including first and second electrodes spaced from each other,
wherein the first electrode has an input portion to which the terminal is connected and an output portion to which the substrate is connected, and
wherein the chip capacitor is placed between the substrate and the one end of the connector case to allow the terminal to be connected to the input portion of the first electrode of the chip capacitor.

10. A gas pressure sensor comprising:
a housing having a gas pressure passage;
a hollow stem mounted in the housing in communication with the gas pressure passage and having a diaphragm operative to deform in response to a gas pressure passed through the gas pressure passage of the housing;
a sensor operative to output an electric signal as a function of deformation of the diaphragm;
a substrate having a circuit for generating an output signal in response to the electric signal delivered from the sensor;
a chip capacitor mounted on the substrate for absorbing noise appearing in the output signal and including first and second electrodes spaced from each other;
a terminal through which the output signal is delivered to an outside of the housing; and
a wiring placed on the substrate on a rear surface thereof and extending from the second electrode of the chip capacitor to electrically connect the second electrode to the housing,
wherein the terminal and the circuit are electrically connected via the first electrode and the second electrode is electrically connected to the housing through the wiring to allow the noise to be outputted to the housing, and
wherein the chip capacitor includes a stack structure, composed of plate-like dielectric bodies and plate-like electrodes that are alternately stacked, which has both ends provided with the first and second electrodes, respectively.

* * * * *